3,001,881
PRE-REACTED GLASS BATCH AND METHOD FOR PRODUCING SAME

Games Slayter, Newark, Ohio, assignor to Owens-Corning Fiberglas Corporation, a corporation of Delaware
No Drawing. Filed Aug. 29, 1955, Ser. No. 531,287
4 Claims. (Cl. 106—52)

This invention relates to a pre-reacted glass batch, and to a method for producing same, the batch being suited, by virtue of the pre-reaction, for extremely rapid melting.

In the production of glass melts for various purposes, including the manufacture of glass sheets and various shaped objects, as well as for fiberization, it has been customary to use a comparatively large melting furnace for the formation of the glass, so that a considerable volume of molten glass, relative to the amount actually used for the manufacture of the desired product, can be maintained. In this way, composition variations in the raw material charged continuously or batchwise can be caused to have no appreciable effect upon composition of the product. For example, if a body of molten glass of 100 units is maintained by adding one unit of raw material per hour and withdrawing one unit of glass per hour to manufacture finished articles, fairly substantial variations in composition of the raw materials charged will have only an inconsequential effect upon the composition of the body of molten glass. Furthermore, using such conventional technique, ample time is provided for dissolution of silica which is usually added as one of the batch ingredients in the molten glass, and is ordinarily slow to fuse and dissolve.

It will be apparent that the melting technique discussed in the preceding paragraph is suitable only for an operation on a continuous basis for an extended period of time. There are instances, however, where it is desired to produce glass articles on a relatively small scale, so that such a technique is unfeasible. It has, heretofore, been customary in such instance, to melt previously formed glass marbles or glass cullet to supply a body of molten glass for such processes. However, in the original production of the glass marbles or glass cullet it has previously been necessary, for the above reasons, to maintain a mass of molten glass large in comparison with the rates of input of raw materials and withdrawal of molten glass.

The advantage of a small glass melting furnace, wherein batch material can be heated rapidly to effect fusion and the fused material used immediately to form glass articles, has been recognized. However, so far as is known, it has not heretofore been practical to effect, in such apparatus, a glass melt which was substantially free of undissolved silica nuclei and of substantially uniform composition throughout even an extremely short period of operation.

The instant invention is based upon the discovery of a method for treating glass batch materials to make rapid a melting possible. The necessity for holding a melt for an extended period of time at a temperature above the liquidus for the particular composition in order to eliminate silica nuclei, and also to assure substantial uniformity of composition throughout a batch is eliminated by this treatment.

It is, therefore, an object of the invention to provide an improved method for treating glass batch prior to melting thereof.

It is a further object of the invention to provide a method for treating free or uncombined silica in glass batch material so that silica nuclei are eliminated when a glass melt is effected by rapid heating of the material.

It is still another object of the invention to provide pre-reacted glass batch material suitable for rapid melting to form glass.

Other objects and advantages will be apparent from the description which follows, which is intended solely for the purpose of illustrating and disclosing the invention, and is in no way to be construed as a limitation thereon.

According to the invention a method for producing pre-reacted glass batch material is provided. The method of the invention comprises autoclaving, under a pressure of at least 100 pounds per square inch and at a temperature at least 325° F., glass-forming ingredients including uncombined silica. The uncombined silica used is at least as fine as 150 mesh, and the autoclaving is continued until at least 40 percent thereof is reacted with basic glass-forming ingredients. At the end of such reaction, substantially all free silica is reduced to a particle size smaller than about 5 microns by virtue of the reaction, which is believed to proceed between the uncombined silica and basic glass-forming ingredients such as $Na_2O$, $K_2O$, CaO, MgO and the like.

Mesh sizes as given herein, and in the appended claims, are sizes, U.S. Sieve Series, unless otherwise indicated.

So far as is known, there is no actual upper limit on temperature and pressure that can be employed during such autoclaving step. All experimental procedures that have been tested indicate that the rate of reaction between uncombined or free silica and various basic glass-forming ingredients is increased by increases in temperature and pressure. As a result, the upper limits on temperature and pressure used for autoclaving are set by the apparatus available and by economic considerations. As a practical matter, there is usually no reason for carrying out the autoclaving at a temperature higher than about 1050° F. and a pressure of about 1000 p.s.i., as the comparatively slight increase in rate of reaction which could be achieved at higher temperatures and pressures does not warrant the cost of autoclaving equipment required.

The resulting autoclaved product, which is hereinafter, for convenience, designated "pre-reacted glass batch," constitutes an excellent ingredient for use in effecting a glass melt by the rapid melting techniques previously discussed. The pre-reacted glass batch, either alone or in combination with other silicates, is then admixed with a binder composition, preferably a silicic acid binder, and the resulting admixture calcined at a temperature not higher than about 1600° F. to evaporate substantially all free water therefrom. The mixture of pre-reacted glass batch and binder should contain virtually no free silica that has a particle size coarser than about 10 microns, and at least 50 percent of the silica therein should be in a combined form.

In addition to pre-reacted glass batch, the admixture described in the preceding paragraph usually includes compounds such as $Na_2O$, $K_2O$, MgO, CaO, $Al_2O_3$, $B_2O_3$ and other glass-forming ingredients, or corresponding compounds such as carbonates, hydroxides and the like which yield such ingredients upon fusion. It will be appreciated, of course, that the precise composition employed will be determined by the end use contemplated for glass produced from the pre-reacted batch. If desired, combined silica can also be added as a compound of the type found in a slag or as such a naturally occurring silicate mineral, clay, or rock formation as one of the feldspars, talc, bentonite, aplite, stilbite, or the like. The maximum permissible amount of any such source for combined silica is that amount which adds the desired amount of a particular ingredient desired in the ultimate glass composition. The precise composition used, of course, will depend upon the end use contemplated for glass produced from the mixture. It has been found to be essential that at least 50 percent of the silica charged be in combined form, for example formed during the production of pre-reacted batch, or of the type found in a slag or in a naturally occurring silicate mineral. It has also been found to be essential that substantially all free silica have a particle size finer than about 10 microns, most desirably finer than about 5 microns.

In some instances, it has been found to be feasible to add all the silica in an entire quantity of particulate glass-forming ingredients in combined form. As a specific example, the glass-forming ingredients have been provided from a clay such as kaolin or bentonite, aplite, which is a rock product that is essentially an aluminum silicate, but contains also some alkalis, and a slag material commercially available under the trademark "Calumite," which is essentially a magnesium-calcium-aluminum-silicate (see analysis, infra).

Usually the chemical analysis desired for a glass batch cannot be provided by mixing silicate minerals, slags, and other available sources for silica in combined form. For example, stilbite is a naturally occurring mineral substance which yields, on fusion, a composition containing about 62 percent of silica, about 10½ percent of $Na_2O$, about 9½ percent of CaO, and about 18 percent of $Al_2O_3$. This composition contains too little silica for ordinary soda lime bottle or window glass, and several times too much alumina. Mixing stilbite with any other source for combined silica to achieve the desired chemical composition is not known to be possible, as the alumina content could not in such way be reduced sufficiently. A limited amount of stilbite could be used, as well as some talc or magnesium silicate and some sodium silicate. However, it would still be necessary to use a substantial portion of free silica or sand in order to achieve the desired composition. Similar problems arise when it is attempted to use any naturally occurring or slag source for combined silica, or a combination of such sources, as the sole source for silica in a glass batch.

In one aspect, therefore, the invention contemplates the use of pre-reacted glass batch in combination with silicates and other glass-forming ingredients and a binder for the production of a material capable of producing glass in a rapid heating operation. The pre-reacted glass batch is used, in such instance, to provide the desired ultimate chemical composition without the necessity for resort to free silica for this purpose.

After the desired admixture of particulate glass-forming ingredients has been effected, as described, a temporary binder is added thereto, together with other substances that may be required or desired. For example, when "Calumite" is used as a source for combined silica, it is usually advantageous to incorporate, in addition to the particulate glass-forming ingredients and the binder, sulfuric acid, or a mixture of sulfuric acid and nitric acid, to facilitate the removal of sulfur during subsequent processing. Excellent results have been achieved using silicic acid as a temporary binder in the formation of such glass-forming material, and by forming the silicic acid in situ in the admixture by virtue of reaction between sodium silicate and the sulfuric acid or mixture of sulfuric and nitric acids. When a silicic acid binder is employed, the silica and sodium oxide, or other comparatively non-volatile material formed therefrom during fusion of the batch, must be considered in determining the relative proportions of various ingredients to be employed. Various other binders for the glass-forming ingredients that can also be employed will be apparent to one skilled in the art. In general, such a binder should be a material which is not thermally decomposed during a calcining step, and one which either fuses or reacts chemically during the calcining to bind together the particles of glass-forming ingredients. Preferably, the binder is not thermally decomposed at temperatures below about 1400° F.

After the admixture of glass-forming ingredients, binder, and any other materials, such as sulfuric acid, has been effected, it is calcined until sensibly dry in order to render the binder effective, but, preferably, at a temperature below the minimum at which the batch becomes sticky. In the case mentioned previously where silicic acid is the binder, it has been found to be advantageous to carry out the calcining at a temperature between about 1000° F. and about 1200° F. in order to accomplish effective binding. Such calcining, of course, also reduces the heat load during ultimate fusing of the pre-reacted batch material.

The following examples are presented solely for the purpose of further illustrating and disclosing the invention, and are in no way to be construed as limitations thereon. In the examples, as in the appended claims, the terms "percent" and "parts" are used to refer to percent and parts by weight unless otherwise indicated.

*Example I*

A mixture of uncombined silica and burned lime was autoclaved according to the following procedure to produce pre-reacted batch comprising a mixture of combined silica and free silica:

A charge of six pounds of minus 200 mesh silica and three pounds of burned lime was thoroughly mixed and introduced into an autoclave. Steam at a pressure of 165 pounds per square inch gauge was then introduced into the autoclave and maintained for a period of 64 hours. After autoclaving, the material was cooled; chemical analysis indicated that 60 percent of the original silica had been reacted and was present in a combined form. It was estimated by microscopic examination that the unreacted silica remaining in the autoclaved product was all finer than about 5 microns. The autoclaved pre-reacted batch can be used as described to produce a composition suited for rapid melting to form a glass.

A small particle of the resulting material was placed on a platinum plate 0.020" thick, with a thermocouple welded to the platinum plate near the sample particle. The plate was then heated rapidly to a temperature between about 2600° F. and about 2650° F., while the sample was examined through a microscope. It was determined that the sample melted completely, with no sign of unfused silica nuclei, approximately 15 seconds after the temperature reached 2600° F.

When, for purposes of comparison, but not in accordance with the invention, a similar melting test was conducted on minus 325 mesh silica, it was found that numerous quartz crystals remained visible after the sample had been maintained above 2600° F. for 60 seconds, including 10 seconds above 2700° F.

A similar procedure was carried out using a mixture of six pounds of approximately 200 mesh silica and three pounds of sodium hydroxide. It was determined that 60 percent of the silica had reacted after 2½ hours of autoclaving, 75 percent after five hours of autoclaving, and 80 percent after 18 hours.

The procedure was also repeated using a mixture of nine pounds of approximate 200 mesh silica and three pounds of sodium hydroxide. It was found that 55 percent of the silica had reacted after five hours, and 65 percent after 18 hours.

The mixtures of sodium silicate and silica produced by the above procedures are suitable for use as described to produce compositions suited for rapid melting to form a glass.

*Example II*

A charge of six pounds of 20 mesh silica and one pound of sodium hydroxide was introduced into a small ball mill, and the mill placed in an autoclave. The mill was rotated to grind the mixture therein, and 40 pounds per square inch gauge steam was introduced into the autoclave. After five hours of autoclaving with the mill rotating it was found that 60 percent of the silica originally introduced was in a combined form.

When the procedure described in the preceding paragraph was repeated except that 200 mesh silica was introduced into the ball mill, it was found that 75 percent of the silica had been converted to a combined form after five hours of autoclaving.

It will be appreciated that one of the problems involved when it is desired to produce a composition that can be heated rapidly to produce a glass is that of achieving the requisite uniformity throughout such composition. The necessary uniformity can be achieved by calcining the starting materials, including silica in combined form, whether as pre-reacted batch or as a naturally occurring silicate, other glass-forming ingredients, and a binder. The beneficial effect of such calcining is demonstrated in the following example.

*Example III*

A calcined charge suitable for rapid melting to form a glass was prdouced from particulate glass-forming ingredients including silica, where all the silica was in a combined form, according to the following procedure:

A dry admixture was prepared from 579 pounds of minus 40 mesh plus 80 mesh "Calumite," and 156 pounds of minus 200 mesh kaolin. A 985 cc. portion of 33 percent sodium silicate was then mixed with the dry admixture, followed by an 80 cc. addition of 98 percent sulfuric acid. The resulting product, which was moist, but somewhat powdery, was then calcined at 1200° F. for sixty minutes to prdouce material suited for glass production by rapid melting. The chemical analysis of the "Calumite" used was as follows:

35–45 percent $SiO_2$
30–35 percent $CaO$
0–10 percent $MgO$
9 percent $Al_2O_3$ After cooling, the calcined product was found to be particulate, most of it being in the form of granules ranging in diameter from about 1/64" to about 1/4", with only a relatively small percentage of fine material. The particles could be readily crushed to a particle size finer than 40 mesh.

A sample of the material was placed on the platinum plate, as described; it was found to fuse approximately 12 seconds after the temperature reached 2600° F. The procedure was repeated, except that the heating was carried out only to a temperature between about 2500° F. and about 2550° F.; in this instance it was found that melting was completed approximately 25 seconds after the sample reached 2500° F.

In order to demonstrate the uniformity of the composition of the calcined material produced as described above, small particles thereof were melted to form glass droplets approximately 1/64" in diameter. The refractive index was determined on 25 different droplets and was found to vary among these samples only plus or minus 0.003.

A sample of the material was also screened and separated into a minus 20 plus 40 mesh portion and also into a minus 200 mesh portion. Each of these two portions was analyzed chemically for CaO. The minus 20 plus 40 mesh material showed 19.8 percent of CaO, and the minus 200 mesh material showed 17.9 percent CaO.

A similar procedure was also carried out using 150 pounds of aplite instead of the kaolin employed in the procedure of the first paragraph of this example; the results achieved were substantially the same as described above.

It has also been found that calcium chloride exerts a significant fluxing action on silica grains. For example, when a particular glass batch which included free or uncombined silica was heated in a conventional manner to produce a glass melt, it was found that fusion of silica nuclei required from 35 to 40 minutes at melting temperature. When an identical procedure was repeated, however, except that 7 percent of the calcium carbonate was omitted from the charge, and was replaced by an equal amount of calcium added as $CaCl_2$, the silica nuclei were completely dissolved after 25 to 30 minutes at the same melting temperature. In addition, the rate of devitrification of the glass made with calcium chloride was appreciably lower, and the viscosity was reduced so that, in the viscosity range of 10 to 1000 poises, it had any given viscosity at a temperature 25 to 30° F. lower than did the corresponding glass where all calcium was added as the carbonate.

The fluxing action of calcium chloride on silica grain was also checked by mixing 625 grams of 20 mesh sand with 1040 grams of calcium chloride and heating the resulting admixture to 2550° F. Complete dissolution of all silica nuclei was accomplished after about fifteen minutes at the indicated temperature. A similar result was achieved when the same procedure was repeated except that minus 200 mesh silica was used instead of the 20 mesh silica. When, however, a mixture of 625 grams of either 20 mesh silica or 200 mesh silica with 375 grams of CaO was heated to 2550° F. no fusion occurred.

What I claim is:

1. A method for producing pre-reacted glass batch which comprises autoclaving about six parts by weight to about nine parts by weight of approximately 200 mesh silica and from about one part by weight to about three parts by weight of sodium hydroxide under a pressure of approximately 165 pounds per square inch gauge for from about two-and-one-half hours to about eighteen hours.

2. A method for producing a uniform, homogeneous glass batch material which comprises: admixing an aqueous silicic acid and particulate glass-forming ingredients including silica and at least one compound which is a particulate glass-forming ingredient and is selected from the group consisting of the oxides of sodium, potassium, magnesium, calcium, aluminum, boron, and compounds which yield such oxides upon fusion, at least 50 percent of said silica being in a combined form, and wherein substantially all free silica has a particle size finer than about 10 microns, wherein the silicic acid is present in an amount effective to act as a binder for the silica and other glass-forming ingredients, and wherein all ingredients are present in proportions in which the admixture forms a glass upon fusion; and calcining the admixture at a temperature not higher than about 1600° F. to evaporate substantially all free water therefrom.

3. A method for producing a glass which comprises: admixing an aqueous silicic acid and particulate glass-forming ingredients including silica, calcium oxide, magnesia, alumina and kaolin, at least 50 percent of said silica being in a combined form and wherein substantially all free silica has a particle size finer than about 10 microns, wherein the silicic acid is present in an amount effective to act as a binder for the particulate glass-forming ingredients, and wherein all ingredients are present in proportions in which the admixture forms a glass upon fusion; calcining the admixture at a temperature not higher than about 1600° F. to evaporate substantially all of the free water therefrom; and melting the resulting calcined product to form a glass.

4. A method for producing a glass which comprises: autoclaving minus 150 mesh silica and at least one basic glass-forming ingredient selected from the group consisting of sodium compounds, potassium compounds, magnesium compounds, and calcium compounds which yield, upon fusion, a glass-forming ingredient of an oxide of such elements, under a pressure of at least 100 pounds per square inch, and at a temperature of at least 325° F., in such proportions and for a time sufficiently long that at least 40 percent of the silica is reacted with the basic glass-forming ingredients, and any remaining uncombined silica is at least as fine as 10 microns; admixing an aqueous silicic acid with the autoclaved material together with any other glass-forming ingredients including silica and compounds which are glass-forming ingredients and are selected from the group consisting of the oxides of sodium, potassium, magnesium, calcium, aluminum, boron, and compounds which yield such oxides upon fusion, any uncombined silica included in said other glass-forming ingredients having a particle size finer than 10 microns, and wherein the silicic acid is present in an amount effective to act as a binder for the autoclaved material, the silica, and the compounds, and wherein all ingredients in said resulting admixture are present in proportions in which the admixture forms a glass upon fusion; calcining the admixture at a temperature not higher than about 1600° F. to evaporate substantially all free water therefrom; and melting the resulting calcined glass batch formulation to form a glass.

References Cited in the file of this patent

UNITED STATES PATENTS

| | | |
|---|---|---|
| 2,215,891 | Thomson et al. | Sept. 24, 1940 |
| 2,234,605 | Rendall | Mar. 11, 1941 |
| 2,434,303 | Weyl | Jan. 13, 1948 |
| 2,665,996 | Kalousek | Jan. 12, 1954 |

FOREIGN PATENTS

| | | |
|---|---|---|
| 16,096 | Germany | 1881 |
| 249,647 | Germany | 1912 |

OTHER REFERENCES

Ceramic Industry, page 72, January 1945.

Morey: Properties of Glass, pages 39, 44 and 45 (1938).